SEMICONDUCTOR INDUCTANCE

Filed July 24, 1959 2 Sheets-Sheet 1

United States Patent Office 3,042,844

Patented July 3, 1962

3,042,844
SEMICONDUCTOR INDUCTANCE

Yasushi Watanabe, 35 Nakasugiyamadori, Sendai, Japan, and Jun-ichi Nishizawa, 56 Komegafukuro Nakachyo, Sendai, Japan Filed July 24, 1959, Ser. No. 829,345

Claims priority, application Japan July 29, 1958

7 Claims. (Cl. 317—234)

This invention relates to semi-conductors and more particularly to means to produce an inductance of high Q value by means of a semi-conductor.

A principal object of the invention is to produce a large inductance by means of a small device to effect conversion and amplification of a signal with the utilization of the phenomenon that the inductance thus produced changes according to the current value and also to provide efficient means to convert a foreign energy into electric energy or a signal.

Two or three reports have been made so far as to the phenomenon that a semi-conductor element having a construction of the p-n junction type or the like shows inductive impedance in the normal direction. The first report about this phenomenon was made by Mr. Shimura at a general meeting of the three electrical societies in 1950 and later a report confirming his finding was made by Mr. Kanai to the Physical Society. The value of Q in the semi-conductors discussed in these reports, however, was very low and the inductance was too small for any practical purposes. When these reports were made, it was not yet known if the Q value could be equivalent to inductance.

The features and advantages of the semi-conductor device in accordance with the present invention will be better understood as described in the following specification and appended claims, in conjunction with the following drawings, in which:

Figure 1:
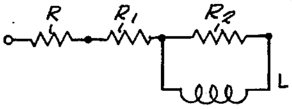
FIG. 1 is a schematic of an equivalent circuit of a device according to the invention.

According to the studies made of the present invention the impedance thereof may be shown as an equivalent circuit in FIG. 1 which has resistances R and $R_1$ connected in series with a circuit in which an inductance L and resistance $R_2$ are connected in parallel. The following formulas:

$$R=(l-L_0)/(q\mu_p b n_0) \quad (1)$$

$$R_1=L_0 q n_0 \mu_p b E^2/[q n_0 \mu_p b E+(1+b)I]^2 \quad (2)$$

$$R_2=L_0 I(1+b)E/[q n_0 \mu_p b E+(1+b)I]^2 \quad (3)$$

$$L\approx L_0 I(1+b)/[2\mu_p\{q n_0 \mu_p b E+(1+b)I\}^2] \quad (4)$$

$$L_0=\mu_p E \tau_p \quad (5)$$

can be established in the case a semi-conductor, of the n-type, per unit area where $l$ is total length; $\tau_p$ is lifetime of a positive hole; $\mu_p$ is the mobility of a positive hole; E is D.C. field; I is D.C. current; $n_0$ is electron density before; $\mu_n/\mu_p=b$ is mobility ratio; $q$ is unit electric charge of the sample.

In the case of a p-type semi-conductor, the result will naturally be the reverse concerning carriers and ratio. Therefore, the explanations hereafter will be confined to an n-type semi-conductor. It is to be noted that the above values are in inverse ratio to the area. In case of $l<\mu_p E\tau_p=L_0$ of the Formulas 1, 2, 3 and 4 may be replaced by the total length of the sample. When an n-type germanium semi-conductor is used, the maximum phase angle is about 27° and Q remains about 0.5. An inductance of several tens of millihenrys can be obtained. The concrete method, namely, the characteristics of this invention are as follows:

When the Formulas 1, 2 and 3 are changed into approximations, for the sake of simplification, they will be as follows provided the electric current is weak and within $$q\mu_p n_0 b E>(1+b)I$$

$$R_1\approx L_0/(q n_0 \mu_p b) \quad (6)$$

$$R_2\approx L_0(1+b)/(q n_0 \mu_p b) \quad (7)$$

$$L\approx L_0^2(+b)/(2 q n_0 \mu_p^2 b E) \quad (8)$$

When the electric current is strong, the formulas will be:

$$R_1\approx L_0\mathrm{E}/[(1+b)I] \quad (9)$$

$$R_2\approx L_0 E(1+b)/[(1+b)I]=L_0 E/I \quad (10)$$

$$L\approx L_0^2/[2\mu_p(1+b)I] \quad (11)$$

In the above formulae as applied to a semi-conductor inductance, it is desired that "L" and "$R_2$" be large. This is realized by making the voltage large without making the current become large in the above formulae. Because of this, a semi-conductor must have a resistance as high as possible. Moreover, how to make the voltage large is accomplished as follows: An ohmic connection 3 is added to an element which has an n-type high resistance semi-conductor 1 connected with a p-type region 2 and after adding lead lines 4 and 5 to it, a joint 6, which must be in the proximity of the ohmic connection and the lead 7, is added to change the electric current between the lead lines 4 and 5 while voltage is applied through a new electrode. Then as the maximum length of $L_0$ is determined by the Formula 5, L, $R_1$ and $R_2$ can be increased along with the increase of E so that excellent characteristics are shown. It is desirable that in an inductance Q be high. Because, of this, "$R_1$" (series resistance) must be small. In this invention this is realized by making "$b$" become exceedingly large. In this case, the formulas from (6) to (11) should be respectively changed into the formulas which follow:

$$R_1=0 \quad (12)$$

$$R_2 \approx L_0/(qn_0\mu_p) \quad (13)$$

$$L \approx L_0/(2qn_0\mu_p{}^2E) \quad (14)$$

$$R_1 \approx 0 \quad (15)$$

$$R_2 \approx L_0E/I \quad (16)$$

$$L \approx L^2/(2\mu_p bI) \quad (17)$$

Figure 2:
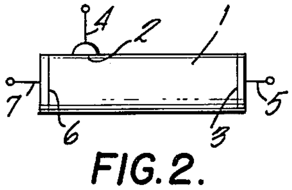
FIG. 2 is a diagrammatic sketch of an element according to the invention and is illustrative of one construction thereof.
Figure 3:
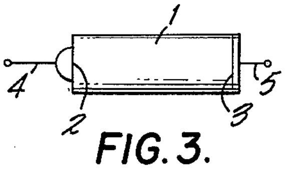
FIG. 3 is a diagrammatic sketch of an element construction to improve characteristics of the element illustrated in FIG. 2.

It is clear from the Formulas 12, 13 and 14 above Q becomes exceedingly high. For instance, in the case of indium antimonide $b=140$ and the value of Q is about five as determined by experiments. Actually to attain several henrys more may be possible. As idicated in FIG. 3, the p-type region 2 is formed by fusing cadmium to the n-type high resistance indium antimonide. It is apparent that this arrangement contributes to improve the construction of the embodiment shown in FIG. 2 to some extent.

In order to increase "$b$" proportionately, arsenic indium may be used. The "$b$" is about 300. The Q value is expected to become as much as about eight.

On the other hand when "$b$" becomes almost zero, for instance when the junction 2 is reversed, to the n-type by using the p-type arsenic indium for the high resistance area 1 the Formulas 9, 10 and 11 on the basis of $b=\mu_p/\mu_n$ will be:

$$R_1 \approx L_0E/I \quad (18)$$

$$R_2 \approx L_0E/I \quad (19)$$

$$L \approx L_0/(2\mu_n I) \quad (20)$$

And the Formulas 6, 7 and 8 will be:

$$R_1 \approx L_0/(qp_0\mu_n b) \quad (21)$$

$$R_2 \approx L_0/(qp_0\mu_n b) \quad (22)$$

$$L \approx L_0{}^2/(2qp_0\mu_n{}^2bE) \quad (23)$$

As known from the above explanations, it is possible to obtain an inductance with a big range of practicability only by a high resistance and the utilization of a region the length of which is shorter than $\tau E\mu$. In order to increase "$b$" further, a semi-conductor may be designed so that an impure material, to form a trap in the n-type high resistance area such as: copper, gold, silver, platinum or molybdenum may be used in a germanium semi-conductor and in the case of a compound semi-conductor almost similar circumstances exist.

Figure 4A:
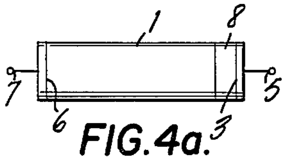
FIG. 4a is a diagrammatic view of an embodiment of an element having current amplification characteristics.
Figure 4B:
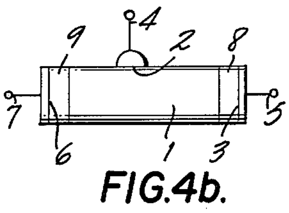
FIG. 4b is a diagrammatic view of an embodiment of a semi-conductor element and is illustrative of an element having a high Q factor according to the invention.

As another effective measure electric current amplification for a few carriers may be used. It is exceedingly easy to make "$R_1$" to decrease by amplification of current. Thus, the scope of practical uses would be limitless if the circuit construction could be adjusted adequately. One of the simplest examples may be shown in FIG. 4. The element shown in FIGS. 4$a$ has a region 8 which has been created by adding a material of high impurity between the ohmic connection 3 of the element and the high resistance region 1 of FIG. 2. The electric charge inflow from the p-n connection or junction 2 causes a large amount of charge inflow by means of L–H connection amplification. This arrangement produces a performance as if "$b$" had actually increased considerably and according to theoretical calculation, to attain $Q=100$ which is not necessarily difficult. FIG. 4$b$ illustrates a construction which is designed in order to increase the Q value as much as several order or magnitudes more by providing a reversal inductance region 9 between the ohmic connection 6 and the high resistance region 1.

Figure 5:
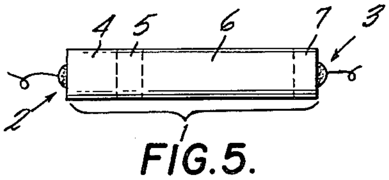
FIG. 5 is a diagrammatic view illustrative of an element having a hook structure or region for current amplification.
Figure 6:
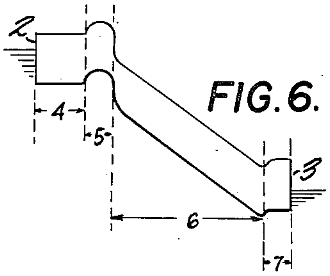
FIG. 6 is a diagram illustrative of voltage distribution principles according to the invention in constructions of the element comparable to the element of FIG. 5.
Figure 12:
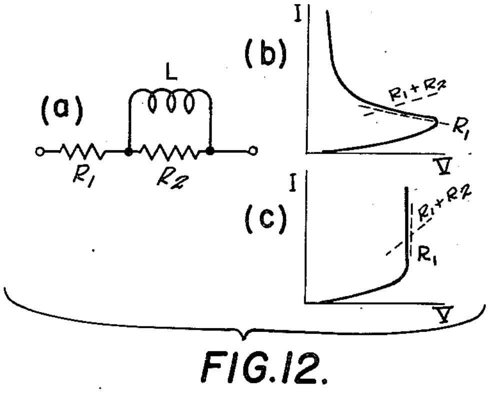
FIG. 12 is a diagram for illustrating resistivity and inductance control in the construction of elements according to the invention.

In order to manufacture a semi-conductor inductance having a high Q value with a means which is easy and steady, it is advisable to adopt a hook structure for the amplification of current. Explanation of the construction details and performance of an inductance brought about by electric current amplification are given below and in FIG. 5. The element shown in FIG. 5 is formed by a main semi-conductor inductance (I) (hereafter it will be referred to as the n-type high resistance, although actually also a p-type or an intrinsic semi-conductor may be used. But the construction is often completely the reverse) with a metallic electrode contact 2 secured with the n-type region 5 and the p-type area 4 as a hook construction. In addition to this, a metallic electrode 3 is fixed to a low resistance p-type region 7 which functions as an emitter region. The electric voltage distribution is shown in FIG. 6 in order to study the electric current which may be passed when a voltage signal is applied to electrodes 2 and 3 in the normal direction or namely in the condition that reverse voltage is applied so that the electrode 2 becomes negative to the electrode 3. The density of positive holes which flow in from the emitter region 7 to the high resistance region 6 by means of a voltage signal increases and the positive holes are accumulated to reduce the diffusion voltage of the hook region 5 against the n-type region 4 and thus helps to increase the inflow of free electrons into the high resistance region 6. At this state as the increase in the flow of free electrons occurs after the arrival of the positive holes at the hook, a time lag results. And it takes some time before the original positive holes permeate the high resistance region 6. Therefore, naturally there is a time lag between the increase of voltage on both terminals and the increase of current. Thus, it may be understood that the device becomes inductive as an equivalent circuit. Besides the resistance of the high resistance region 6 does not decrease on the other hand when the voltage decreases. This is because resistance is still low as the positive holes still remain in the hook 5 allowing much of the injection of free electrons from the n-type region 4. Therefore, in order to have the resistance of the layer 6 increased, time is required until all the injected positive holes concentrate on the hook 5, and then pass to the n-type region or otherwise disappear by re-combination and after that the excessive free electrons injected pass from the high resistance region 6 to the emitter region 7. The time thus required corresponds to a very big inductance. Actually, the free electrons injected are accumulated at the potential minimum point 9 on the border region before they enter into the emitting region 7 in case of the construction shown in FIG. 5, helping the injection of positive holes. Therefore, it often results in an infinite series, increasing inductance and occasionally changing resistance $R_1$ into negative resistance at the equivalent circuit shown in FIG. 12. In other words, resistance $R_1$ can be adjusted adequately by controlling the construction of the junction points. When the resistance is reduced to zero, the characteristic in terms of D.C. is generally like the one shown in FIG. 12$b$ and when the resistance is negative, the characteristic is like the one shown in FIG. 12$c$. If the mobility characteristic is measured by an extremely high frequency, $R_1+R_2$ is obtained. $R_2$ is generally determined by a specific resistance of the high resistance area 6 and it is possible to expect that its value reaches several megohm. It is quite easy to obtain several henrys of inductance of that element and it can be easily selected.

It is presumed that the principle of this invention has been understood without any difficulty by the explanation given so far. And it is to be noted that the scope of practical applications of this invention is limitless and not only for application as a choke coil inductance in a rectification circuit. It is quite easy to regulate inductance either by increasing voltage by means of a bias voltage or by adding a number of electrodes. It is possible to obtain various forms of application and wide scope of utility of this element by changing the voltage of the control electrodes which produces a variation in the phase deviations or amplitude of the signal. That is to say, the values of inductance and resistance of the semi-conductor device are changed according to the control voltage applied to the electrodes and as a result of the change of said values this device can be utilized in order to modulate or convert a voltage signal.

Figure 7:
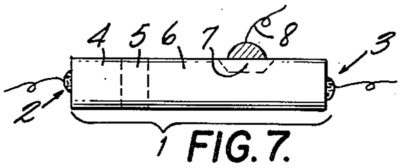
FIG. 7 is a diagrammatic view of an element construction according to the invention permitting inductance regulation of a high order.

The element shown in FIG. 7 is an example of a construction in which the injecting region is separated from the main electrode 3 connected in a region (indium alloy, for instance). This design is characterized by a specially large capacity of regulation.

Figure 8:
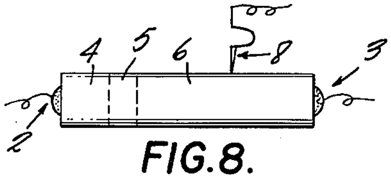
FIG. 8 is a diagrammatic view of an element of the type illustrated in FIG. 7 and illustrates the use of a needle-shaped injection or control electrode.

FIG. 8 shows a construction in which the injecting electrode is a needle-shaped metal electrode.

Figure 9:
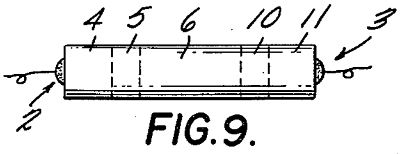
FIG. 9 is a diagrammatic view of an element having hook constructions at opposite ends of the element adjacent the main electrodes.
Figure 10:
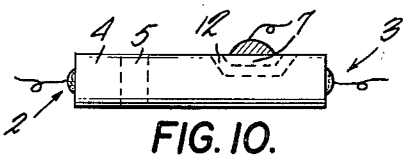
FIG. 10 is a diagrammatic view of an embodiment of a modification of the element illustrated in FIG. 9.

FIG. 9 is an example in which two main electrodes 2 and 3 are connected with the hook constructions 4, 5 and 10, 11 which are axially spaced. FIG. 10 resembles FIG. 9. It is an example in which instead of the main electrode 3, the control electrode 8 is given the role for one of the hooks 12–7.

Figure 11:
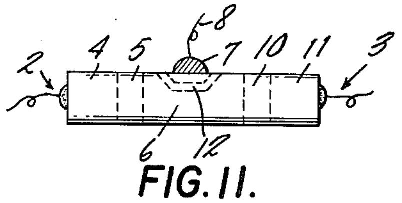
FIG. 11 is a diagrammatic view of an element embodying features of the elements shown in FIGS. 9 and 10.

FIG. 11 is an example of an element in which a hook construction is added to each of the above three designs. Many similar designs are possible.

Figure 13:
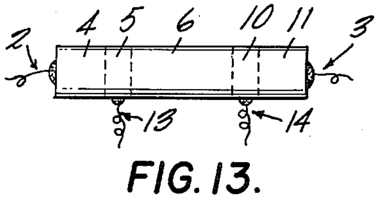
FIG. 13 is a diagrammatic view of an element in which hook regions comprise control electrodes.

FIG. 13 is an example of an element in which a separate electrode is applied to the hook construction regions 5–10 to make each a control electrode 13, 14. Many other similar designs can be conceived.

Figure 14:
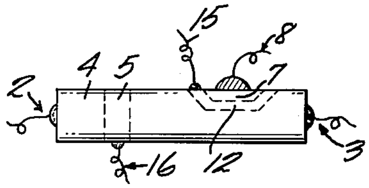
FIG. 14 is a diagrammatic view of an element illustrative of a modification of the element shown in FIG. 10.
Figure 15:
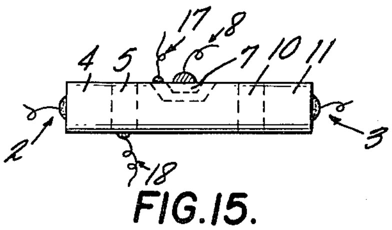
FIG. 15 is a diagrammatic view of an element illustrative of a modification of the element shown in FIG. 11.

FIGS. 14 and 15 are illustrations of variations of the elements of FIGS. 10 and 11. In actual manufacturing many technical methods including alloying diffusion method, etc. may be applicable.

One of the outstanding features of this invention, is that a device or element can be constructed to give a performance which resembles that of a grid arc-suppressible thyraton. The principle of the G.A.S.T. performance is the same with that which has been explained and so it might be taken as one of the applications of this device. The operational changes in this apparatus due to the effect of $\tau E\mu$ change, temperature change, electron flow etc. according to the change of electromagnetic field is an important matter but is omitted because it is secondary to the explanation of the characteristics of this invention.

What we claim and desire to secure by Letters Patent is:

1. A semi-conductor inductance having at least two contiguous semi-conductor regions comprising, electrical connections for applying potential to said semi-conductor inductance, a semi-conductor region having a higher volume resistivity to electrical conduction than the other semi-conductor region, said higher volume resistivity semi-conductor region having the characteristic of resisting change in the number of current carriers therein when a potential is applied thereto and to said other semi-conductor region so that current carriers are caused to flow in said semi-conductor regions and from said other region into the higher volume resistivity region, said other region comprising a semi-conductor region for diffusing current carriers therein to create a current flow time lag within said semi-conductor thereby to cause the semi-conductor inductance to function as an inductance with a high inductive reactance value.

2. A semi-conductor inductance having a plurality of contiguous semi-conductor regions comprising, electrical connections for applying potential to said semi-conductor inductance, a semi-conductor region having a higher volume resistivity to electrical conductor than the other semi-conductor regions, said higher volume resistivity semi-conductor region having the characteristic of resisting change in the number of current carrers therein when a potential is applied thereto and to said other semi-conductor regions so that current carriers are caused to flow in said semi-conductor regions and from said other regions into the higher resistivity region, a semi-conductor region for diffusing current carriers therein to create a current flow time lag within said semi-conductor thereby to cause the semi-conductor inductance to function as an inductance with a high inductive reactance value, and a current carrier trap in said higher resistivity semi-conductor region.

3. A semi-conductor inductance having a plurality of contiguous semi-conductor regions comprising, electrical connections for applying potential to said semi-conductor inductance, a semi-conductor region having a higher volume resistivity to electrical conduction than the other semi-conductor regions, said higher volume resistivity semi-conductor region having the characteristic of resisting change in the number of current carriers therein when a potential is applied thereto and to said other semi-conductor so that current carriers are caused to flow in said semi-conductor regions and from said other regions into said higher volume resistivity region, a semi-conductor region for diffusing current carriers therein to create a current flow time lag within said semi-conductor thereby to cause the semi-conductor inductance to function as an inductance with a high inductive reactance value, and injection means including an injection region for injecting reverse sign current carriers into said higher volume resistivity semi-conductor region.

4. A semi-conductor inductance having a plurality of contiguous semi-conductor regions comprising, electrical connections for applying potential to said semi-conductor inductance, a semi-conductor region having a higher volume resistivity to electrical conduction than the other semi-conductor regions, said higher volume resistivity semi-conductor region having the characteristic of resisting change in the number of current carriers therein when a potential is applied thereto and to said other semi-conductor so that current carriers are caused to flow in said semi-conductor regions and from said other regions into said higher volume resistivity region, a semi-conductor region for diffusing current carriers therein to create a current flow time lag within said semi-conductor thereby to cause the semi-conductor inductance to function as an inductance with a high inductive reactance value, and one of said regions having means to function as a current amplifying region.

5. A semi-conductor inductance having a plurality of contiguous semi-conductor regions comprising, electrical connections for applying potential to said semi-conductor inductance, a semi-conductor region having a higher volume resistivity to electrical conduction than the other semi-conductor regions, said higher volume resistivity semi-conductor region having the characteristic of resisting change in the number of current carriers therein when a potential is applied thereto and to said other semi-conductor so that current carriers are caused to flow in said semi-conductor regions and from said other regions into said higher volume resistivity region, a semi-conductor region for diffusing current carriers therein to create a current flow time lag within the semi-conductor thereby to cause the semi-conductor inductance to function as an inductance with a high inductive reactance value, a current carrier trap in the first-mentioned semi-conductor region, and injection means including an injection region for injecting reverse sign current carriers into said higher volume resistivity semi-conductor region.

6. A semi-conductor inductance having a plurality of contiguous semi-conductor regions comprising, electrical connections for applying potential to said semi-conductor inductance, a semi-conductor region having a higher volume resistivity to electrical conduction than the other semi-conductor regions, said higher volume resistivity semi-conductor region having the characteristic of resisting change in the number of current carriers therein when a potential is applied thereto and to said other semi-conductor so that current carriers are caused to flow in said semi-conductor regions and from said other regions into said higher volume resistivity region, a semi-conductor region for diffusing current carriers therein to create a current flow time lag within said semi-conductor thereby to cause the semi-conductor inductance to function as an inductance with a high inductive reactance value, a current carrier trap in the first-mentioned semi-conductor region, injection means including an injection region for injecting reverse sign current carriers into said higher resistivity semi-conductor region, and one of said regions having means to function as a current amplifying region.

7. A semi-conductor inductance having a plurality of contiguous semi-conductor regions comprising, electrical connections for applying potential to said semi-conductor inductance, an n-type semi-conductor region comprising indium antimonide having a higher volume resistivity to electrical conduction than the other semi-conductor regions, said higher volume resistivity semi-conductor region having the characteristic of resisting change in the number of current carriers therein when a potential is applied thereto and to said other semi-conductor so that current carriers are caused to flow in said semi-conductor regions and from said other regions into said higher volume resistivity region, and a semi-conductor region for diffusing curent carriers therein to create a current flow time lag within said semi-conductor thereby to cause the semi-conductor inductance to function as an inductance with a high inductive reactance value.

No references cited.